July 19, 1949.        C. C. JOHNSON        2,476,493
DOLLY FOR TRUCK WHEELS

Filed July 6, 1945        2 Sheets-Sheet 1

Inventor
Conrad C. Johnson

By Clarence A. O'Brien
and Harvey B. Jacobson
Attorneys

July 19, 1949.  C. C. JOHNSON  2,476,493
DOLLY FOR TRUCK WHEELS
Filed July 6, 1945  2 Sheets-Sheet 2

Inventor
Conrad C. Johnson

By Clarence A. O'Brien
and Harvey B. Jacobson
Attorneys

Patented July 19, 1949

2,476,493

UNITED STATES PATENT OFFICE 2,476,493

DOLLY FOR TRUCK WHEELS

Conrad C. Johnson, Malin, Oreg.

Application July 6, 1945, Serial No. 603,538

1 Claim. (Cl. 254—2)

The present invention relates to a new and useful improvement in dollies for truck wheels, and more particularly for use in facilitating the removal and installation of dual wheels on trucks.

An important object of the present invention is to provide a dolly adapted for movement into position under the wheels of a truck, after the latter has been jacked up, for the purpose of supporting the wheels in an upright position to facilitate the sliding of the hub of the wheels into and out of position on the axle of the truck without requiring the lifting of the wheel by the mechanic.

A further important object of the invention is to provide a dolly of this character adapted for supporting dual truck wheels during the removal and installation thereof on the axle of the truck, and also embodying means for vertically adjusting one end of the dolly into a position for evenly supporting both tires of the wheels to compensate for uneven wear in one of the tires, and so that the axis of the hub of the dual wheel assembly may be supported in the plane of the axis of the axle on which the wheels are to be mounted.

A further object of the invention is to provide a dolly of this character by means of which the wheels may be raised or lowered from the ground to avoid the necessity of a mechanic lifting the wheels onto the dolly.

Another object of the invention is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 1, 7:
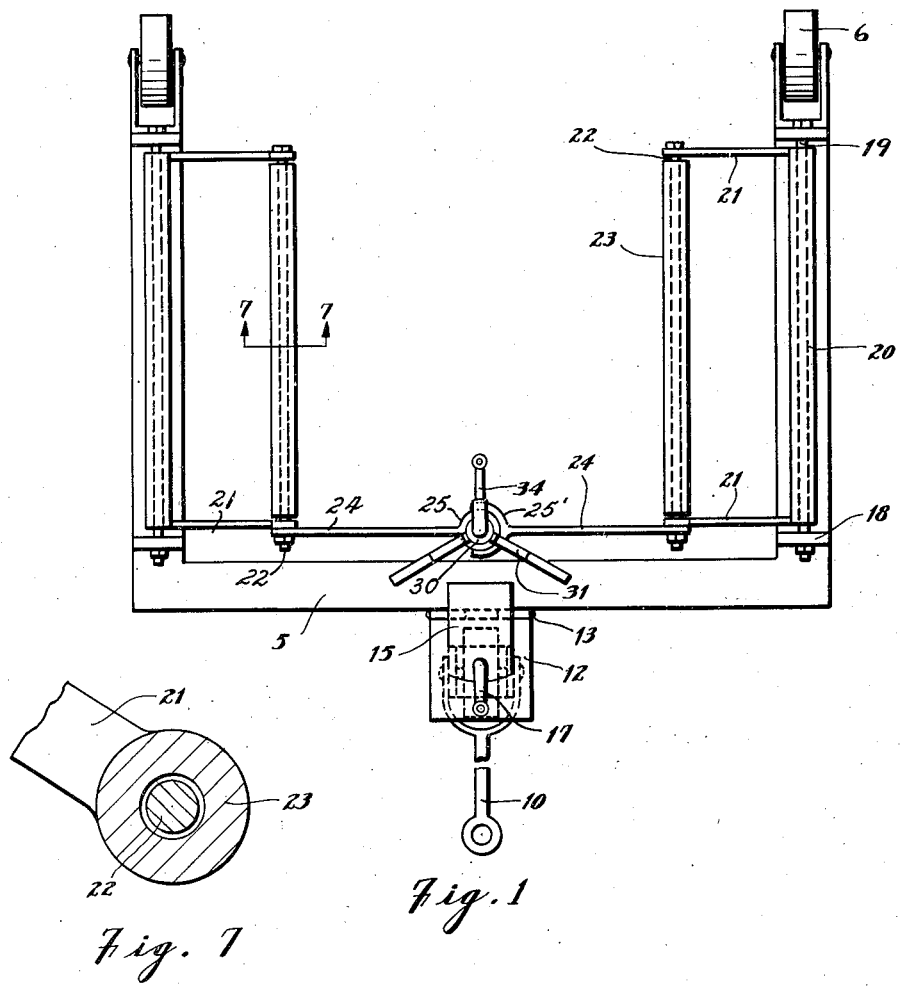
Figure 1 is a top plan view.
Figure 7 is a transverse sectional view through one of the rollers taken substantially on a line 7—7 of Figure 1.
Figure 2:
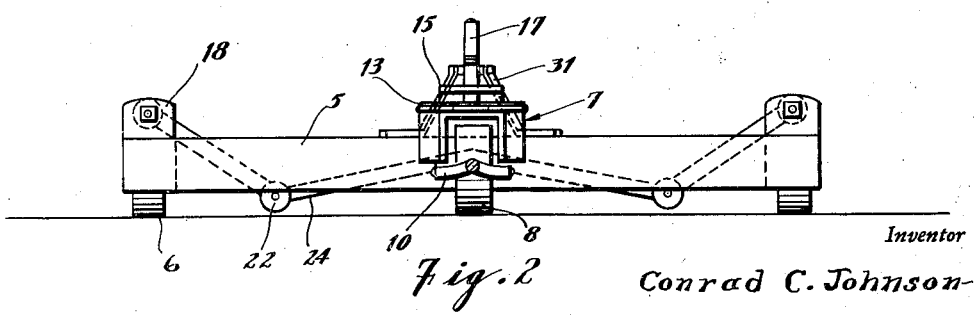
Figure 2 is a front elevational view.

Referring now to the drawings in detail, wherein for the purpose of illustration I have disclosed a preferred embodiment of this invention. The numeral 5 designates a substantially U-shaped frame having wheels 6 journaled at its end portions and provided with an upwardly projecting angular bracket 7 at its front or bight portion to the underside of which is a wheel 8 swivelly mounted by means of an inverted yoke 9.

A handle 10 is pivotally secured to the axle of the wheel 8 for moving the dolly over the ground, and for steering the front wheel 8.

Figure 3:
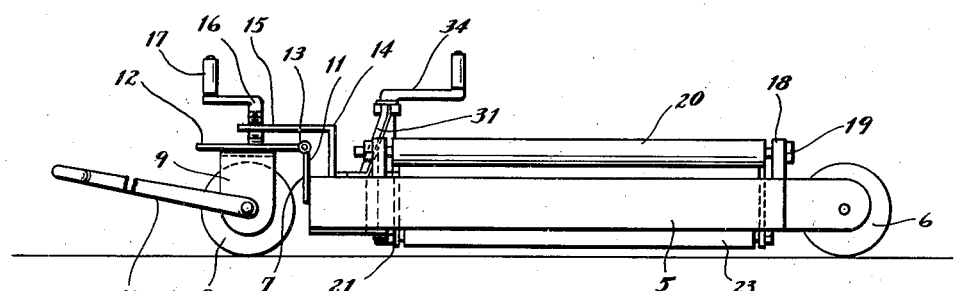
Figure 3 is a side elevational view.

The bracket 7 includes vertical and horizontal portions 11 and 12 hingedly connected to each other by means of a hinge member 13 and an angular bracket 14 is also secured to the bight or front portion of the frame 5 and includes a horizontal portion 15 overlying the horizontal portion 12 of the bracket 7 and through which a screw 16 is threaded having a crank handle 17 at its upper end. The lower end of the screw 16 is adapted to bear on the horizontal portion 12 of the bracket 7 as indicated in Figure 3 of the drawings whereby an adjustment of the screw 16 will serve to vertically adjust the front end of the frame 5 at the hinge 13.

A pair of apertured lugs 18 are welded or otherwise secured to the upper surface of the leg portion of the frame 5 adjacent the front and rear ends thereof and in each pair of lugs is secured a shaft or rod 19 having a sleeve or tube 20 freely mounted thereon for pivotal movement.

A pair of arms 21 project radially from the ends of the tube 20 in an inward direction with respect to the legs of the frame and on the ends of the arms 21 is secured a shaft or rod 22 having a roller 23 journaled thereon.

Figure 4:
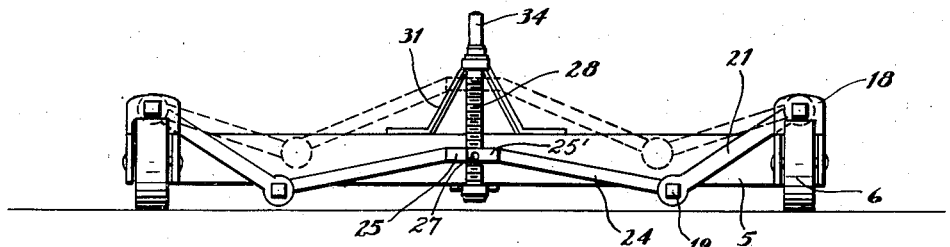
Figure 4 is a rear elevational view.
Figures 5, 6:
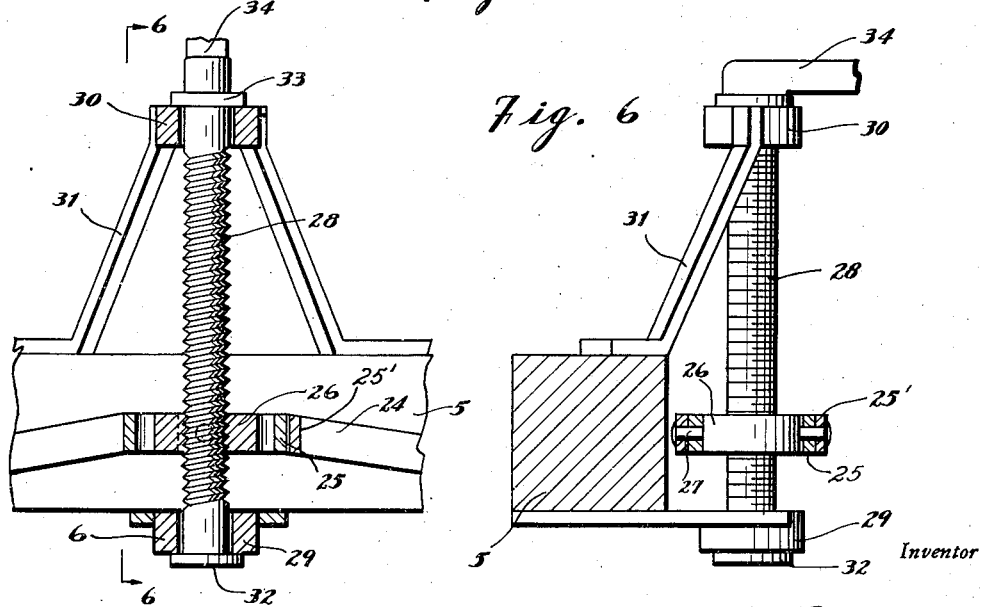
Figure 5 is an enlarged vertical sectional view through the adjusting screw.
Figure 6 is a similar view taken substantially on a line 6—6 of Figure 5.

To the front ends of the rods, or shafts, 22 are pivotally connected the outer ends of a pair of arms 24, one having a yoke ring 25 formed on its inner end and in which an internally threaded collar 26 is secured by pins 27 at diametrically opposite sides of said yoke ring and upon which said yoke ring 25 is vertically swingable. The other arm 24 is provided with an inner end forked yoke 25' straddling the yoke ring 25 and swingable vertically on said pins 27. As best shown in Figures 1, 4 and 6, the yoke ring 25 encircles the collar 26 and the forked yoke 25' straddles said yoke ring 25.

A screw 28 is threaded through the collar 26, the screw being journaled in its lower end in a bearing 29 secured to the lower edge of the bight portion of the frame 5 and the screw is journaled in its upper end in a bearing 30 supported in an elevated position by brackets 31 rising from the upper edge of the bight portion of the frame. Flanges 32 and 33 are formed on the upper and lower portions of the screw below and above the lower and upper bearings 29 and 30, respectively, to prevent vertical movement of the screw relative to the frame. The upper end of the screw is formed with a crank handle 34.

In the operation of the device when it is desired to remove the wheel from a truck, the screw 28 is operated in a manner to move the ring 25 downwardly whereby to lower the arms 24 and the rollers 23 into a position adjacent the ground as shown by the full lines of Figure 4 of the drawings. The dolly may then be rolled under the wheel of the truck with one of the rollers 23 in front of the wheel and the other of the rollers 23 behind the wheel. The screw 28 is then operated to raise the roller 23 into a position for engaging the bottom of the wheel of the truck whereby the wheel will be supported on said rollers and removed from the axle of the truck by pulling the dolly outwardly at the side of the truck.

In removing dual wheels from trucks and where one of the tires of the wheel has worn more than the other of said tires, the screw 16 is operated to rise or lower the front end of the dolly to compensate for the uneven wear in the wheels of the truck and in order that the rollers 23 will support both of said wheels.

If desired a hydraulic or other conventional form of jack may be substituted in place of the screw type of jack as herein disclosed.

It is believed that the details of construction, manner of operation and advantages of the device will be readily understood from the foregoing without further detailed explanation.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A dolly for installing and removing truck wheels comprising a U-shaped frame, wheels supporting said frame, a pair of elongated rollers, means for rotatably supporting the rollers at the sides of the frame inwardly thereof and vertically swingable to correspondingly swing the rollers, a vertical rotatable screw mounted on said frame and having a collar thereon vertically adjustable by rotation of said screw, and a pair of arms swingably connected at one end to one end of said roller supporting means and having yokes on the other ends thereof pivoted to said collar with the yoke of one arm straddling the other yoke and said other yoke encircling said collar.

CONRAD C. JOHNSON.

REFERENCES CITED

The following references are of record in the file of this patent:

UNITED STATES PATENTS

| Number | Name | Date |
|---|---|---|
| 2,170,607 | Green | Aug. 22, 1939 |
| 2,386,516 | Thompson | Oct. 9, 1945 |

FOREIGN PATENTS

| Number | Country | Date |
|---|---|---|
| 575,066 | Germany | Apr. 24, 1933 |